(12) United States Patent
Yamakawa et al.

(10) Patent No.: US 10,074,396 B2
(45) Date of Patent: *Sep. 11, 2018

(54) MAGNETIC RECORDING MEDIUM AND MAGNETIC RECORDING AND REPRODUCING APPARATUS

(71) Applicant: SHOWA DENKO K.K., Tokyo (JP)

(72) Inventors: Eishin Yamakawa, Ichihara (JP); Katsuaki To, Ichihara (JP); Saeko Hayase, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 15/264,988

(22) Filed: Sep. 14, 2016

(65) Prior Publication Data

US 2017/0084305 A1    Mar. 23, 2017

(30) Foreign Application Priority Data

Sep. 18, 2015 (JP) ................. 2015-185500
Feb. 29, 2016 (JP) ................. 2016-038321

(51) Int. Cl.
   *G11B 5/65* (2006.01)
   *G11B 19/28* (2006.01)
   *G11B 21/10* (2006.01)
   *G11B 5/72* (2006.01)
   *G11B 5/725* (2006.01)

(52) U.S. Cl.
   CPC ............... *G11B 19/28* (2013.01); *G11B 5/72* (2013.01); *G11B 5/725* (2013.01); *G11B 21/106* (2013.01)

(58) Field of Classification Search
   CPC ............ C10M 107/38; C10M 2213/00; C10M 2213/04; C10M 2213/043; C10M 2213/06; C10M 2213/0606; G11B 5/725; C10N 2040/18; C10N 2240/204
   See application file for complete search history.

(56) References Cited

U.S. PATENT DOCUMENTS 6,136,403 A       10/2000  Prabhakara et al.
6,875,492 B1 *    4/2005   Pirzada ............... G11B 5/72
                                                      428/216

(Continued)

FOREIGN PATENT DOCUMENTS

CN  101121908 A   2/2008
CN  102356431 A   2/2012

(Continued)

OTHER PUBLICATIONS

An Office Action dated Feb. 12, 2018, which issued during the prosecution of U.S. Appl. No. 15/202,674.

(Continued)

*Primary Examiner* — Holly Rickman
(74) *Attorney, Agent, or Firm* — Sughrue Mion, PLLC

(57) ABSTRACT

In a magnetic recording medium of the present invention, an outermost surface of a protective layer 3 on a lubricant layer 4 side contains carbon and nitrogen in a range of 50 atomic % to 90 atomic %, and the lubricant layer 4 is formed by being in contact with the outermost surface, contains compounds A to C represented in the below general formulas (1) to (3) described below, and has a film thickness of 0.5 nm to 2 nm.

(Continued)

$$HOCH_2CF_2CF_2O(CF_2CF_2CF_2O)_s$$
$$CF_2CF_2CH_2OCH_2CH(OH)CH_2OH \quad (3)$$

5 Claims, 1 Drawing Sheet

(56) References Cited

U.S. PATENT DOCUMENTS

| | | | |
|---|---|---|---|
| 2011/0064970 A1* | 3/2011 | Chen | C10M 157/10 |
| | | | 428/833 |
| 2013/0083422 A1 | 4/2013 | Ooeda et al. | |
| 2013/0209837 A1* | 8/2013 | Sagata | G11B 5/725 |
| | | | 428/833 |
| 2014/0139946 A1 | 5/2014 | Ota | |
| 2014/0212692 A1* | 7/2014 | Matsumoto | C10M 169/04 |
| | | | 428/832 |
| 2016/0240219 A1* | 8/2016 | Maruyama | G11B 5/725 |
| 2017/0011765 A1* | 1/2017 | Nakamura | G11B 5/725 |

FOREIGN PATENT DOCUMENTS

| | | |
|---|---|---|
| CN | 107004430 A | 8/2017 |
| JP | 62-66417 A | 3/1987 |
| JP | 02-010518 A | 1/1990 |
| JP | H06-333231 A | 12/1994 |
| JP | 09-171615 A | 6/1997 |
| JP | 9-282642 A | 10/1997 |
| JP | 09-288818 A | 11/1997 |
| JP | 10-049853 A | 2/1998 |
| JP | 2002-275484 A | 9/2002 |
| JP | 2005-122790 A | 5/2005 |
| JP | 2009-211765 A | 9/2009 |
| JP | 2010-108583 A | 5/2010 |
| JP | 2013-157048 A | 8/2013 |
| JP | 2013-163667 A | 8/2013 |
| JP | 2014-116060 A | 6/2014 |

OTHER PUBLICATIONS

An Office Action dated Feb. 13, 2018, which issued during the prosecution of U.S. Appl. No. 15/044,529.

Communication dated May 12, 2015, from Japanese Patent Office in counterpart application No. 2015-029178.

Communication dated Apr. 4, 2018 from the State Intellectual Property Office of the P.R.C. in counterpart Application No. 201610088013.8.

Communication dated May 22, 2018, from the Japanese Patent Office in counterpart application No. 2015-134652.

Communication dated Jun. 28, 2018, from the State Intellectual Property Office of People's Republic of China in counterpart Application No. 201610487247.X.

* cited by examiner

MAGNETIC RECORDING MEDIUM AND MAGNETIC RECORDING AND REPRODUCING APPARATUS

BACKGROUND OF THE INVENTION

Field of the Invention

The present invention elates to a magnetic recording medium which is preferably used in a magnetic recording and reproducing apparatus such as a hard disk drive, and a magnetic recording and reproducing apparatus including the magnetic recording medium.

Priority is claimed on Japanese Paten Application No. 2015-185500, filed on Sep. 18, 2015 and Japanese Patent Application No. 2016-038321, filed on Feb. 29, 2016, the contents of which are incorporated herein by reference.

Description of Related Art

In order to improve recording density of a magnetic recording and reproducing apparatus, a magnetic recording medium suitable for high recording density has been developed.

In the related art, examples of the magnetic recording medium include a magnetic recording medium in which a recording layer for recording information, a protective layer formed of carbon or the like, and a lubricant layer are formed on a substrate in this order. The protective layer protects the information recorded on the recording layer and increases slidability of a magnetic head. However, it is not possible to obtain sufficient durability of the magnetic recording medium only by disposing the protective layer on the recording layer.

For this reason, in general, the lubricant layer is formed by applying a lubricant onto the surface of the protective layer. By disposing a lubricant layer on the protective layer, it is possible to prevent the magnetic head of the magnetic recording and reproducing apparatus from being directly in contact with the protective layer, and to reduce a frictional force of the magnetic head sliding on the magnetic recording medium, and thus, durability is improved.

A perfluoropolyether-based lubricant, an aliphatic hydrocarbon-based lubricant, and the like have been proposed as the lubricant which is used in the magnetic recording medium.

For example, in Patent Document 1, a magnetic recording medium coated with a lubricant of perfluoroalkyl polyether (diol) having a structure of $HOCH_2—CF_2O—(C_2F_4O)p-(CF_2O)q-CH_2OH$ (p and q are integers) is disclosed.

In Patent Document 2, a magnetic recording medium coated with a lubricant formed of perfluoroalkyl polyether (tetraol) having a structure of $HOCH_2CH(OH)—CH_2OCH_2CF_2O—(C_2F_4O)p-(CF_2O)q-CF_2CH_2OCH_2—CH(OH)CH_2OH$ (p and q are integers) is disclosed.

In Patent Document 3, a lubricant for a magnetic recording medium which has a perfluorooxy alkylene unit selected from $—CF_2O—$ or $—CF_2CF_2O—$ and contains a phosphazene compound is disclosed.

In Patent Document 4, a magnetic recording medium including a lubricant layer in which a phosphazene compound and a compound having a perfluorooxy alkylene unit are mixed in a specific range is disclosed. In addition, in Patent Document 4, it is disclosed that the lubricant layer has a high bonding force with respect to the protective layer, and even in a case where the layer thickness of the protective layer decreases, a high coating ratio can be obtained.

In Patent Document 5, a lubricant containing a compound denoted by $R^1—C_6H_4O—CH_2CH(OH)CH_2OCH_2—R^2—CH_2—O—R^3$ is disclosed.

In addition, outgas from siloxane-based organic Si which is used as a rubber seal for sealing the magnetic recording and reproducing apparatus is one of ionic contaminants on the magnetic recording medium. It is known that the outgas from the siloxane-based organic Si causes breakage or contamination of the magnetic head of the magnetic recording and reproducing apparatus (for example, refer to Patent Document 6).

PRIOR ART DOCUMENTS

Patent Documents

[Patent Document 1] Japanese Unexamined Patent Application, First Publication No. S62-66417

[Patent Document 2] Japanese Unexamined Patent Application, First Publication No. H-9-282642

[Patent Document 3] Japanese Unexamined Patent Application, First Publication No. 2002-275484

[Patent Document 4] Japanese Unexamined Patent Application, First Publication No. 2010-108583

[Patent Document 5] Japanese Unexamined Patent Application, First Publication No. 2013-163667

[Patent Document 6] Japanese Unexamined Patent Application, First Publication No. 2014-116060

SUMMARY OF THE INVENTION

In the magnetic recording medium, recording density is required to be improved by further decreasing a floating amount of the magnetic head. For this reason, the thickness of the lubricant layer is required to be further thinned.

However, in a case where the thickness of the lubricant layer is thinned, a gap is formed in the lubricant layer, an environmental substance enters from the gap of the lubricant layer, and contamination occurs, and thus, the magnetic recording medium is contaminated. In a case where the magnetic recording medium is contaminated, a contaminant on the magnetic recording medium is attached (transferred) to the magnetic head.

The present invention has been made in consideration of the circumstances described above, and an object of the present invention is to provide a magnetic recording medium which is rarely contaminated by an environmental substance even in a case where the thickness of a lubricant layer is thinned, and a magnetic recording and reproducing apparatus including the magnetic recording medium.

In order to attain the object described above, the present inventors have conducted intensive studies on the basis of a relationship between the surface of a protective layer arranged by being in contact with the lubricant layer and the material of the lubricant layer.

As a result thereof, it has been found that it is possible to prevent the magnetic recording medium from being contaminated due to entering of an environmental substance from a gap of the lubricant layer by configuring the protective layer and the lubricant layer as described below. That is, a protective layer in which the outermost surface on the lubricant layer side contains carbon and nitrogen in a range of 50 atomic % to 90 atomic % is used as the protective layer. Then, a lubricant layer which is formed by being in contact with the outermost surface of the protective layer, and is formed of a compound having a specific composition from which a high bonding force with respect to a nitrogen-containing layer can be obtained without being in the shape of an island or a mesh is used as the lubricant layer.

The present invention has been made on the basis of the findings described above, and the gist thereof is as described below.

[1] According to an aspect of the present invention, there is provided a magnetic recording medium including at least a magnetic layer, a protective layer, and a lubricant layer on a nonmagnetic substrate in this order, in which an outermost surface of the protective layer on the lubricant layer side contains carbon and nitrogen, the nitrogen is contained in the outermost surface in a range of 50 atomic % to 90 atomic %, the lubricant layer is formed by being in contact with the outermost surface, has an average film thickness of 0.5 nm to 2 nm, and contains a compound A represented in the below general formula (1), a compound B represented in the below general formula (2), and a compound C represented in the below general formula (3), and a mass ratio (A/(A+B+C)) of the compound A with respect to a sum of masses of the compounds A, B, and C contained in the lubricant layer is in a range of 0.05 to 0.6, a mass ratio (B/(A+B+C)) of the compound B with respect to the sum of the masses of the compounds A, B, and C contained in the lubricant layer is in a range of 0.05 to 0.5, and a mass ratio (C/(A+B+C)) of the compound C with respect to the sum of the masses of the compounds A, B, and C contained in the lubricant layer is in a range of 0.05 to 0.9.

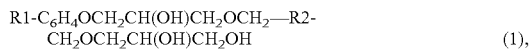

R1-C$_6$H$_4$OCH$_2$CH(OH)CH$_2$OCH$_2$—R2-CH$_2$OCH$_2$CH(OH)CH$_2$OH (1), (In the general formula (I), R1 is an alkoxy group having 1 to 4 carbon atoms, R2 is —CF$_2$O(CF$_2$CF$_2$O)x(CF$_2$O)yCF$_2$— (an order in parentheses of x and y may be this order, the opposite order, or a random order (each of x and y is an integer of 0 to 15)).)

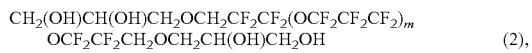

CH$_2$(OH)CH(OH)CH$_2$OCH$_2$CF$_2$CF$_2$(OCF$_2$CF$_2$CF$_2$)$_m$OCF$_2$CF$_2$CH$_2$OCH$_2$CH(OH)CH$_2$OH (2), (In the general formula (2), in is an integer in a range of 4 to 50.)

HOCH$_2$CF$_2$CF$_2$O(CF$_2$CF$_2$CF$_2$O)s CF$_2$CF$_2$CH$_2$OCH$_2$CH(OH)CH$_2$OH (3)

(In the general formula (3), s is an integer.)

[2] The magnetic recording medium according to [1], in which an average molecular weight of the compound A may be in a range of 1,000 to 2,500.

[3] The magnetic recording medium according to [1] or [2], in which an average molecular weight of the compound B may be in a range of 1,000 to 2,500.

[4] The magnetic recording medium according to any one of [1] to [3], in which an average molecular weight of the compound C may be in a range of 1,000 to 2,000.

[5] According to another aspect of the present invention, there is provided a magnetic recording and reproducing apparatus, including: the magnetic recording medium according to any one of [1] to [4]; a medium-driving unit that drives the magnetic recording medium in a recording direction; a magnetic head that records information to the magnetic recording medium and reproduces information from the magnetic recording medium; a head-moving unit that moves the magnetic head relative to the magnetic recording medium; and a recording and reproducing signal-processing unit that processes a recording signal transmitted to the magnetic head and a reproducing signal received from the magnetic head.

The magnetic recording medium of the present invention includes the protective layer in which the outermost surface (outermost layer) on the lubricant layer side contains carbon and nitrogen, the nitrogen is contained in the outermost surface in a range of 50 atomic %) to 90 atomic %, and the lubricant layer which is formed by being in contact with the outermost surface of the protectiv layer, d conta ns the compound A, the compound B, and the compound C at a predetermined ratio. For this reason, in the magnetic recording medium of the present invention, the lubricant layer is not in the shape of an island or a mesh, and thus, the lubricant layer is bonded to the protective layer with a strong bonding force. Accordingly, even in a case where the average film thickness of the lubricant layer is thinned to be in a range of 0.5 nm to 2 nm, it is possible to prevent the magnetic recording medium from being contaminated due to entering of an environmental substance from a gap of the lubricant layer. Therefore, the magnetic recording medium of the present invention can respond to further improvement in a recording density even in a case where the thickness of the lubricant layer is sufficiently thinned.

In addition, the magnetic recording and reproducing apparatus of the present invention includes the magnetic recording medium of the present invention which is rarely contaminated. For this reason, in the magnetic recording and reproducing apparatus of the present invention, a contaminant existing on the magnetic recording medium is transferred onto the magnetic head of the magnetic recording and reproducing apparatus, and thus, it is possible to prevent recording and reproducing properties from decreasing or floating stability from deteriorating. Accordingly, the magnetic recording and reproducing apparatus of the present invention has stable magnetic recording and reproducing properties.

DETAILED DESCRIPTION OF THE INVENTION

Hereinafter, an embodiment of the present invention will be described in detail.

Figure 1:
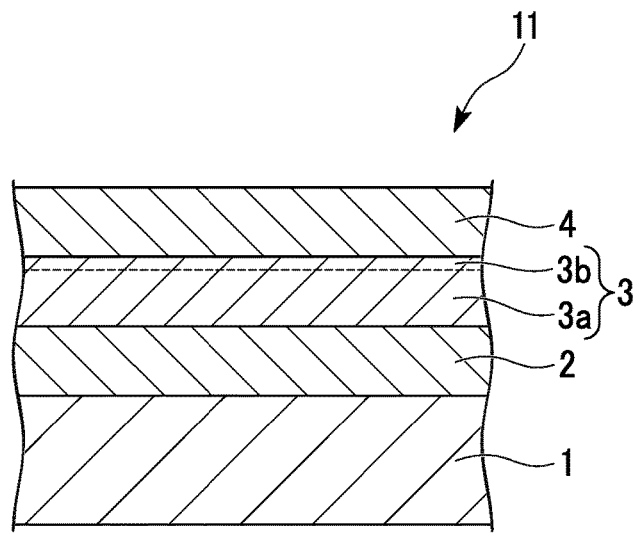
FIG. 1 is a schematic sectional view illustrating an example of a magnetic recording medium of the present invention.

FIG. 1 is a schematic sectional view illustrating an example of a magnetic recording medium according to an embodiment of the present invention.

As illustrated in FIG. 1, in a magnetic recording medium 11 of the embodiment of the present invention, a magnetic layer 2, a protective layer 3, and a lubricant layer 4 are laminated on a nonmagnetic substrate 1 in this order.

Furthermore, in this embodiment, a case where adhesive layer, a soft magnetic underlayer, a seed layer, and an orientation control layer are laminated between the nonmagnetic substrate 1 and the magnetic layer 2 in this order will be described as an example. The adhesive layer, the soft magnetic underlayer, the seed layer, and the orientation control layer are disposed, as necessary, and apart or all of these layers may not be disposed.

(Nonmagnetic Substrate)

A nonmagnetic substrate in which a film formed of NiP or a NiP alloy is formed on a substrate formed of a metal material such as Al or an alloy material such as an Al alloy, and the like can be used as the nonmagnetic substrate 1. In addition, a nonmagnetic substrate formed of a non-metal material such as glass, ceramic, silicon, silicon carbide, carbon, and a resin may be used as the nonmagnetic substrate and a nonmagnetic substrate in which a film formed of NiP or an NiP alloy is formed on a substrate formed of a non-metal material may be used as the nonmagnetic substrate 1.

(Adhesive Layer)

In a case where the nonmagnetic substrate 1 is arranged in contact with the soft magnetic underlayer disposed on the adhesive layer, the adhesive layer prevents corrosion of the nonmagnetic substrate 1 from progressing. For example, Cr, a Cr alloy, Ti, a Ti alloy, and the like can be suitably selected as the material of the adhesive layer. It is preferable that the thickness of the adhesive layer be greater than or equal to 2 nm to obtain sufficient adhesiveness.

The adhesive layer, for example, can be formed by a sputtering method.

(Soft Magnetic Underlayer)

It is preferable that the soft magnetic underlayer have a structure in which a first soft magnetic film, intermediate layer formed of a Ru film, and a second soft magnetic film are laminated in this order. That is, it is preferable that the soft magnetic underlayer have a structure in which the soft magnetic films on and under the intermediate layer are subjected to antiferromagnetic coupling (AFC) by interposing the intermediate layer formed of the Ru film between the two soft magnetic films. The soft magnetic underlayer has a structure in which the AFC coupling is performed, and thus, it is possible to increase resistance with respect to a magnetic field from the outside and resistance with respect to a Wide Area Tack Erasure (WATE) phenomenon, which is a problem peculiar to vertical magnetic recording.

The film thickness of the soft magnetic underlayer is preferably in a range of 15 nm to 80 nm, and is more preferably in a range of 20 nm to 50 nm. In a case where the film thickness of the soft magnetic underlayer is less than 15 nm, the magnetic flux from a magnetic head cannot be sufficiently absorbed, writing becomes insufficient, and recording and reproducing properties may deteriorate. Therefore, setting the film thickness of the soft magnetic underlayer to be less than 15 nm is not preferable. In contrast, in a case where the film thickness of the soft magnetic underlayer is greater than 80 nm, productivity significantly decreases. Therefore, setting the film thickness of the soft magnetic underlayer to be greater than 80 nm is not preferable.

It is preferable that the first soft magnetic film and the second soft magnetic film be formed of a CoFe alloy. In a case where the first soft magnetic film and the second soft magnetic film are formed of a CoFe high saturated magnetic flux density Bs (greater than or equal to 1.4(T)) can be realized.

In addition, it is preferable that any one of Zr, Ta, and Nb be added to the CoFe alloy which is used in the first soft magnetic film and the second soft magnetic film. Accordingly, amorphization of the first soft magnetic film and the second soft magnetic film is accelerated, the orientation of the seed layer can be improved, and the floating amount of the magnetic head can be reduced. The soft magnetic underlayer can be formed by a sputtering method.

(Seed Layer)

The seed layer is for controlling the alignment and the crystal size of the orientation control layer and the magnetic layer 2 which are disposed on the seed layer, and thus, a vertical directional component with respect to a substrate surface of a magnetic flux generated from the magnetic head increases, and a magnetization direction of the magnetic layer 2 is more strongly fixed in a direction vertical to the nonmagnetic substrate 1.

It is preferable that the seed layer formed of a NiW alloy. In a case where the seed layer is formed of the NiW alloy, as necessary, other elements such as B, Mn, Ru, Pt, Mo, and Ta may be added to the NiW alloy.

It is preferable that the film thickness of the seed layer be in a range of 2 nm to 20 nm. In a case where the film thickness of the seed layer is less than 2 nm, an effect which is obtained by disposing the seed layer may become insufficient. On the other hand, it is not preferable that a case where the film thickness of the seed layer be greater than 20 nm since the crystal size increases.

The seed layer can be formed by a sputtering method.

(Orientation Control Layer)

The orientation control layer controls the alignment of the magnetic layer 2 such that the alignment becomes excellent. It is preferable that the orientation control layer be formed of Ru or a Ru alloy.

It is preferable that the film thickness of the orientation control layer be in a range of 5 nm to 30 nm. By setting the film thickness of the orientation control layer to be less than or equal to 30 nm, it is possible to decrease a distance between the magnetic head and the soft magnetic underlayer, and it is possible to make the magnetic flux from the magnetic head steep. In addition, by setting the film thickness of the orientation control layer to be greater than or equal to 5 nm, it is possible to control the alignment of the magnetic layer 2 such that the alignment becomes excellent.

The orientation control layer may be formed of one layer, or may be formed of a plurality of layers. In a case where the orientation control layer is formed of a plurality of layers, all of the orientation control layers may be formed of the same material, or at least a part of the orientation control layers may be formed of a different material.

The orientation control layer can be formed by a sputtering method.

(Magnetic Layer)

The magnetic layer 2 is formed of a magnetic film in which an easy axis of magnetization is directed towards a direction vertical to the substrate surface. The magnetic layer 2 contains Co and Pt, and may contain an oxide, or Cr, B, Cu, Ta, Zr, and the like in order to enhance SNR properties.

Examples of the oxide contained in the magnetic layer 2 include $SiO_2$, SiO, $Cr_2O_3$, CoO, $Ta_2O_3$, $TiO_2$, and the like.

The magnetic layer 2 may be formed of one layer, or my be formed of a plurality of layers having different compositions.

For example, in a case where the magnetic layer 2 is formed of three layers of a first magnetic layer, a second magnetic layer, and a third magnetic layer, it s preferable that the first magnetic layer have a granular structure formed of a material containing Co, Cr, and Pt, and an oxide. For example, oxides of Cr, Si, Ta, Al, Ti, Mg, Co, and the like are preferably used as the oxide contained in the first magnetic layer. Among the particular, $TiO_2$, $Cr_2O_3$, $SiO_2$, and the like can be preferably used. In addition, it is preferable that the first magnetic layer be formed of a composite oxide in which two or more types of oxides are added. Among them, in particular, $Cr_2O_3$—$SiO_2$, $Cr_2O_3$—$TiO_2$, $SiO_2$—$TiO_2$, and the like can be preferably used.

The first magnetic layer can contain one or more types of elements selected from B, Ta, Mn, Cu, Nd, W, Nb, Sm, Tb, Ru, and Re in addition to Co, Cr, Pt, and an oxide.

By containing the element described above, it is possible to accelerate refinement of magnetic particles or to improve crystallinity or orientation, and it is possible to obtain recording and reproducing properties and thermal fluctuation properties suitable for higher density recording.

The same material as that of the first magnetic layer can be used in the second magnetic layer. It is preferable that the second magnetic layer have a granular structure.

In addition, it is preferable that the third magnetic layer have anon-granular structure formed of a material which contains Co, Cr, and Pt, but does not contain oxide. The third magnetic layer can contain one or more types of elements selected from B, Ta, Mo, Cu, Nd, W, Nb, Sm, Tb, Ru, Re, and Mn in addition to Co, Cr, and Pt. The third magnetic layer contains the elements described above in addition to Co, Cr, and Pt, and thus, it is possible to accelerate the refinement of the magnetic particles or to improve the crystallinity or the orientation, and it is possible to obtain recording and reproducing properties and thermal fluctuation properties suitable for higher density recording.

It is preferable that the thickness of the magnetic layer 2 be 5 nm to 25 nm. In a case where the thickness of the magnetic layer 2 is less than 5 nm, sufficient reproducing output cannot be obtained, and thermal fluctuation properties also decrease. In addition, in a case where the thickness of the magnetic layer 2 is greater than nm, it is not preferable since the magnetic particles in the magnetic layer 2 are enlarged, noise at the time of performing recording and reproducing increases, and recording and reproducing properties represented by a signal/noise ratio (an S/N ratio) or recording properties (OW) deteriorate.

In a case where the magnetic layer 2 is formed of a plurality of layers, it is preferable that a non-magnetic layer be disposed between the adjacent magnetic layers. In a case where the magnetic layer 2 is formed of three layers of the first magnetic layer, the second magnetic layer, and the third magnetic layer, it is preferable that the non-magnetic layer be disposed between the first magnetic layer and the second magnetic layer and between the second magnetic layer and the third magnetic layer.

By disposing the non-magnetic layer between the magnetic layers with a suitable thickness, magnetization reversal of the magnetic particles configuring each of the films (the magnetic layer) is easily performed, and thus, it is possible to decrease the dispersion of the magnetization reversal of the entire magnetic particles, and it is possible to further improve the S/N ratio.

For example, Ru, a Ru alloy, a CoCr alloy, a CoCrX1 alloy (X1 represents at least one or two or more elements selected from Pt, Ta, Zr, Re, Ru, Cu, Nb, Ni, Mn, Ge, Si, O, N, W, Mo, Ti, Zr, and B.), and the like can be preferably used in the material of the non-magnetic layer disposed between the magnetic layers.

In addition, it is preferable that an alloy material containing an oxide, a nitride, or a carbide be used in the material of the non-magnetic layer disposed between the magnetic layers. Specific examples of the oxide include $SiO_2$, $Al_2O_3$, $Ta_2O_5$, $Cr_2O_3$, MgO, $Y_2O_3$, $TiO_2$, and the like. Specific examples of the nitride include AlN, $Si_3N_4$, TaN, CrN, and the like. TaC, BC, SiC, and the like can be respectively used as a specific example of the carbide.

It is preferable that the thickness of the non-magnetic layer disposed between the magnetic layers be 0.1 nm to 1 nm. By setting the thickness of the non-magnetic layer to be in the range described above, it is possible to further improve the S/N ratio, The non-magnetic layer can be formed by a sputtering method.

In addition, in order to realize higher recording density, it is preferable that the magnetic layer 2 be a magnetic layer of vertical magnetic recording in which the easy axis of magnetization is directed towards the vertical direction with respect to the substrate surface, and the magnetic layer 2 may be a magnetic layer of in-plane magnetic recording.

The magnetic layer 2 may be formed by any known method of the related art such as a vapor deposition method, an ion beam sputtering method, and a magnetron sputtering method, and in general, the magnetic layer 2 is formed by a sputtering method.

(Protective Layer)

The protective layer 3 protects the magnetic layer 2. As illustrated in FIG. 1, the protective layer 3 of this embodiment includes a protective film layer 3a, and a nitrogen-containing layer 3b which is formed on the protective film layer 3a on the lubricant layer 4 side (in FIG. 1, an upper surface).

The protective film layer 3a contains carbon or hydrogenated carbon, and may be formed of only carbon or only hydrogenated carbon, or may contain nitrogen in addition to the carbon or the hydrogenated carbon. The protective film layer 3a may be formed of one layer, or may be formed of a plurality of layers.

The nitrogen-containing layer 3b contains nitrogen and carbon. The nitrogen-containing layer 3b may contain other atoms such as a hydrogen atom in addition to a nitrogen atom and a carbon atom.

The nitrogen-containing layer 3b includes the outermost surface (the outermost surface of the protective layer on the lubricant layer side, and a boundary surface between the nitrogen-containing layer 3b and the lubricant layer 4, and outermost layer) carbon and nitrogen. The nitrogen is contained in the outermost surface in a range of 50 atomic % to 90 atomic %. The nitrogen content in the nitrogen-containing layer 3b may be uniform, and for example, may have a concentration gradient in which the nitrogen content is the largest in the outermost surface and decreases as the depth is increased.

In a case where the nitrogen content in the outermost surface of the nitrogen-containing layer 3b is in the range described above, a compound A to a compound C described below, which form the nitrogen-containing layer 3b and the lubricant layer 4, are bonded to each other with a high bonding force.

A nitrogen atom contained in the outermost surface of the nitrogen-containing layer 3b forms a strong bond with a hydroxyl group contained in the compound A to the compound C described below. In a case where the nitrogen content in the outermost surface of the nitrogen-containing layer 3b is greater than or equal to 50 atomic %, the nitrogen atom contained in the outermost surface of the nitrogen-containing layer 3b can sufficiently ensure the number of bondings with respect to the hydroxyl group contained in the compound A with respect to the compound C, and the protective layer 3 is bonded to the lubricant layer 4 with a high bonding force. In order to ensure the number of bondings between the nitrogen atom contained in the nitrogen-containing layer 3b and the hydroxyl group contained in the compound A to the compound C, the nitrogen content of the outermost surface of the nitrogen-containing layer 3b is preferably greater than or equal to 60 atomic %, and is more preferably greater than or equal to 70 atoinic %.

A carbon ato contained in the outermost surface of the nitrogen-containing layer 3b forms a strong bond with a six-membered ring (—C$_6$H$_4$—) contained in the compound A described below. In a case where the nitrogen content in the outermost surface of the nitrogen-containing layer 3b is less than or equal to 90 atomic %, the number of carbon atoms contained in the outermost surface of the nitrogen-containing layer 3b is sufficiently ensured.

Therefore, the number of bondings between the carbon atom contained in the nitrogen-containing layer 3b and the six-membered ring contained in the compound A can be sufficiently ensured, and ti e protective layer 3 is bonded to the lubricant layer 4 with a high bonding force. In order to ensure the number of bondings between the carbon atom contained in the nitrogen-containing layer 3b and the six-membered ring contained in the compound A, it is preferable that the nitrogen content in the outermost surface of the nitrogen-containing layer 3b be less than or equal to 80 atomic %.

In this embodiment, the surface of the protective layer on the lubricant layer side "containing carbon and nitrogen in a range of 50 atomic % to 90 atomic %" indicates a protective layer in whici the nitrogen content in the outermost surface is in a range of 50 atomic % to 90 atomic % by measuring the surface of the protective layer on the lubricant layer side, for example, with an X-ray photoelectron spectroscopy (XPS/ESCA).

It is preferable that the film thickness of the protective layer 3 (the total film thickness of the protective film layer 3a and the nitrogen-containing layer 3b) be in a range of 1 nm to 10 nm. In a case where the film thickness of the protective layer 3 is less than or equal to 10 nm, it is possible to sufficiently reduce magnetic spacing in the magnetic recording and reproducing apparatus including the magnetic recording medium 11 of this embodiment, and it is possible to correspond to further improvement in recording density. Furthermore, the magnetic spacing indicates a distance between the magnetic head and the magnetic layer 2. As the magnetic spacing becomes narrower, the electromagnetic conversion properties of the magnetic recording and reproducing apparatus can be improved. In a case where the film thickness of the protective layer 3 is greater than or equal to 1 nm, an effect of protecting the magnetic layer 2 increases, and durability can be improved.

The protective layer 3, for example, can be formed by the following method.

In a case where the protective film layer 3a is formed of carbon, for example, the protective film layer 3a can be formed by a sputtering method in which a carbon target material is used as a raw material.

In a case where the protective film layer 3a is formed of hydrogenated carbon, for example, the protective film layer 3a c be formed by a chemical vapor deposition (CVD) method using a hydrocarbon raw material such as ethylene or toluene, an ion beam vapor deposition (IBD) method, and the like.

In a case where the protective film layer 3a contains nitrogen in addition to the carbon or the hydrogenated carbon, for example, the protective film layer 3a can be formed by the same method as that in a case where the protective film layer 3a is formed of carbon or a case where the protective film layer 3a is formed of hydrogenated carbon, by using a raw material which contains nitrogen as a raw material.

Next, the protective film layer 3a (a lubricant layer 4 side surface) is subjected to nitriding processing (or dehydrogenating processing and nitriding processing), and thus, the nitrogen-containing layer 3b is formed.

A known method can be used as the method of performing the nitriding processing (or the dehydrogenating processing and the nitriding processing) with respect to the protective film layer 3a. Specifically, examples of the method include a method of injecting nitrogen ions into the protective film layer 3a, a method of exposing the protective film layer 3a to nitrogen plasma, and the like. The nitrogen-containing layer 3b formed by such a method has a concentration gradient m inch the nitrogen content is the largest in the outermost surface and decreases as the depth is increased, and thus, it is preferable that both of a hard carbon film having a high strength and a carbon film containing nitrogen which has high coating properties of a lubricant be obtained.

In a case where the method of injecting the nitrogen ion is used, for example, it is possible to set the nitrogen content of the outermost surface of the nitrogen-containing layer 3b to be in a range of 50 atomic % to 90 atomic % by controlling the injection amount of the nitrogen ion. In addition, in a case where the method of exposing to the nitrogen plasma is used, for example, it is possible to set the nitrogen content of the outermost surface of the nitrogen-containing layer 3b to be in a range of 50 atomic % to 90 atomic % by controlling a time for exposing the protective film layer 3a to the nitrogen plasma (a processing time) and/or a nitrogen plasma density.

In the example illustrated in FIG. 1, a case where the protective film layer 3a, and the nitrogen-containing layer 3b which is formed by performing the nitriding processing or the dehydrogenating processing and the nitriding processing) with respect to the protective film layer 3a are included as the protective layer 3 has been described as an example, and the protective layer of the present invention may be a protective layer in which the outermost surface on a lubricant layer side contains carbon and nitrogen in a range of 50 atomic % to 90 atomic %, or may be any protective layer.

For example, the protective layer may be a protective layer which is formed of only one layer containing carbon and nitrogen in a range of 50 atomic % to 90 atomic % and is formed on the magnetic layer 2 by a sputte ing method, a CVD method, an IBD method, and the like using a raw material containing carbon and nitrogen. In this case, the concentration of nitrogen contained in the raw material is controlled, and thus, it is possible to set the nitrogen content of the outermost surface of the protective layer to be in a range of 50 atomic % to 90 atomic %.

(Lubricant Layer)

The lubricant layer 4 is formed by being in contact with the outermost surface of the nitrogen-containing layer 3b of the protective layer 3.

The lubricant layer 4 contains the compound A represented in the below general formula (1), the compound B represented in the below general formula (2), and the compound C represented in the below general formula (3).

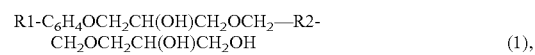
(1), (in the general formula (1), R1 is an alkoxy group having 1 to 4 carbon atoms. R2 is —CF$_2$O(CF$_2$CF$_2$O)x(CF$_2$O) yCF$_2$— (an order in parentheses of x and y may be this order, the opposite order, or a random order each of x and y is an integer of 0 to 15)).)

(2)

(in the general formula (2), m is an integer in a range of 4 to 50.)

(3)

(In the general formula (3), s is integer.)

[Compound A]

In the compound A, the six-membered ring (—C$_6$H$_4$—) having a large cyclic skeleton which is arranged in a position close to a terminal forms a strong bond with the carbon atom contained in the outermost surface of the nitrogen-containing layer 3b. addition, in the compound A, a terminal group formed of —CH(OH)CH$_2$OH having two hydroxyl groups positioned on a terminal on a side opposite to R1 and a hydroxyl group in an intermediate portion form a strong bond with the nitrogen atom contained in the outermost surface of the nitrogen-containing layer 3b. Therefore, the compound A is selectively bonded to the carbon atom of which the content is relatively small on the outermost surface of the nitrogen-containing layer 3b in a position close to one terminal, and is bonded to the nitrogen atom on the outermost surface of the nitrogen-containing layer 3b on the other terminal. As a result thereof, the compound A rarely becomes in the shape of an island on the outermost surface of the nitrogen-containing layer 3b, and is easily arranged over a surface direction.

In the compound A represented in the above general formula (1), R1 is an alkoxy group having 1 to 4 carbon atoms.

R1 is an alkoxy group having 1 to 4 carbon atoms, and thus, the six-membered ring (—C$_6$H$_4$—) contained in the compound A is arranged in a position close to the terminal of the compound A. It is preferable that the number of carbon atoms of R1 in the compound A decrease since the position of the six-membered ring becomes the position closed to the terminal and the position of the six-membered ring is separated from the terminal group formed of —CH(OH)CH$_2$OH, and thus, the compound A easily spreads on the outermost surface of the nitrogen-containing layer 3b in the surface direction, and it is most preferable that the number of carbon atoms be 1.

In the compound A represented in the above general formula (1), x and y of R2 are each an integer of 0 to 15. For this reason, the molecular weight of the compound A becomes suitable. Therefore, in a case where a lubricant layer is formed by applying a lubricant containing the compound A, it is possible to prevent the lubricant from being rarely applied by excessively increasing the molecular weight of the compound A. In addition, the spread of the compound A in the surface direction on the outermost surface of the nitrogen-containing layer 3b does not become insufficient by excessively decreasing the molecular weight of the compound A.

It is preferable that the average molecular weight of the compound A represented in the above general formula (1) be in a range of 1,000 to 2,500. In a case where the average molecular weight of the compound A is less than or equal to 2,500, a lubricant which has a low viscosity and is easily applied is easily obtained in a case where a lubricant layer is formed by applying a lubricant containing the compound A to the compound C. In a case where the average molecular weight of the compound A is greater than or equal to 1,000, the lubricant layer 4 of which the thickness rarely decreases is easily obtained, and excellent durability is obtained even in a case of being used under a high-temperature and high-humidity environment.

Examples of the compound A include ART-1 (Product Name: manufactured by MORESCO Corporation). In ART-1 (Product Name), R1 in the general formula (1) is an alkoxy group having 1 carbon atom, x and y of R2 are each an integer of 3 to 7, and the average molecular weight is adjusted to be in a range of 1,000 to 2,500.

[Compound B1]

The compound B has four hydroxyl groups, and has a terminal group which is formed of —CH(OH)CH$_2$OH having two hydroxyl groups and is arranged on both terminals. In the compound B, the hydroxyl group is bonded to the nitrogen atom of which the content is relatively large on the outermost surface of the nitrogen-containing layer 3b on both terminals.

For this reason, the compound B has a strong bonding force with respect to the nitrogen-containing layer 3b.

In addition, the compound B does not have a cyclic skeleton, and has the suitable number of oxygen atoms a suitable number of ether bonds (—O—)) with respect to the number of carbon atoms in a perfluoropolyether chain, and thus, has a suitable hardness.

In the compound B represented in the above general formula (2), m is an integer in a range of 4 to 50. For this reason, the molecular weight of the compound B becomes suitable. Therefore, in a case where a lubricant layer is formed by applying a lubricant containing the compound B, it is possible to prevent the lubricant from being rarely applied by excessively increasing the molecular weight of the compound B. In addition, the spread of the compound B in the surface direction on the outermost surface of the nitrogen-containing layer 3b does not become insufficient by excessively decreasing the molecular weight of the compound B.

It is preferable that the average molecular weight of the compound B represented in the above general formula (2) be in a range of 1,000 to 2,500. In a case where the average molecular weight of the compound B is less than or equal to 2,500, a lubricant which has a low viscosity and is easily applied is easily obtained in a case where a lubricant layer is formed by applying a lubricant containing the compound A to the compound C. In a case where the average molecular weight of the compound B is greater than or equal to 1,000, the lubricant layer 4 of which the thickness rarely decreases is easily obtained, and excellent durability is obtained even in a case of being used under a high-temperature and high-humidity environment.

Examples of the compound B include D4OH(s) (Product Name: manufactured by MORESCO Corporation). In D4OH(s) (Product Name), m in the general formula (2) is an integer in a range of 4 to 50, and the average molecular weight is adjusted to be in a range of 1,000 to 2,500.

[Compound C]

The compound C has three hydroxyl groups, and has a terminal group which is formed of —CH(OH)CH$_2$OH having two hydroxyl groups and is arranged in one terminal and a terminal group which is formed of —CH$_2$OH having one hydroxyl group and is arranged on the other terminal. In the compound C, the hydroxyl group is bonded to the nitrogen atom of which the content is relatively large on the outermost surface of the nitrogen-containing layer 3b on both terminals. For this reason, the compound C has a strong bonding force with respect to the nitrogen-containing layer 3b.

In addition, the compound C does not have a cyclic skeleton, and has the suitable number of oxygen atoms (a suitable number of ether bonds (—O—)) with respect to the number of carbon atoms in a perfluoropolyether chain, and thus, has a suitable hardness.

The compound C has three hydroxyl groups, and thus, has intermediate properties between a lubricant having four hydroxyl groups (for example, the compound B) and a lubricant having two hydroxyl groups (for example, diol). In addition, the compound C has an asymmetrical straight chain chemical structure, and thus, a bonding state which is different from that of the compound B on the surface of the nitrogen-containing layer 3b can be obtained. Accordingly, as in this embodiment, the compounds B and C are mixed, and thus, uncovered regions can be mutually compensated by both compounds, and an uncovered region of the compound A can be also compensated.

It is preferable that the average molecular weight of the compound C represented in the above general formula (3) be in a range of 1,000 to 2,000. In a case where the average molecular weight of the compound C is less than or equal to 2,000, a lubricant which has a low viscosity and is easily applied is easily obtained in a case where a lubricant layer is formed by applying a lubricant containing the compound A to the compound C. In a case where the average molecular weight of the compound C is greater than or equal to 1,000, the lubricant layer 4 of which the thickness rarely decreases is easily obtained, and excellent durability is obtained even in a case of being used under a high-temperature d high-humidity environment.

Examples of the compound C include D3OH(s) (Product Name: manufactured by MORESCO Corporation). In D3OH(s) (Product Name), the value of s in the general formula (3) is adjusted such that the average molecular weight is in a range of 1,000 to 2,000.

In this embodiment the lubricant layer 4 containing the compound A to the compound C is disposed by being in contact with the outermost surface of the protective layer 3, and thus, as described below, the thickness of the lubricant layer 4 can be thinned.

As described above, the compound A is easily arranged over the surface direction, and thus, easily becomes in the shape of a mesh, and a imp between the compounds A is easily formed. The compound B and the compound C do not have a cyclic skeleton, and has a suitable number of oxygen atoms (a suitable number of ether bonds (—O—)) with respect to the number of carbon atoms in the perfluoropolyether chain, and thus, have a suitable hardness. For this reason, in the lubricant layer 4 of this embodiment, the compound B and the compound C enter the gap formed between the compounds A, and thus the gap between the compounds A is filled with the compound B and thee compound C. As a result thereof, it is possible to prevent the magnetic recording medium 11 from being contaminated due to entering of an environmental substance from a gap of the lubricant layer 4, and it is possible to thin the thickness of the lubricant layer 4.

In contrast, for example, in a case where a film having an average film thickness of less than or equal to 2 nm is formed by using only the compound A instead of the lubricant layer 4, the compound A has a molecular structure of a large cyclic skeleton, and thus, a mesh-like film is formed, a gap is formed in the lubricant layer 4, and the surface of the protective layer 3 cannot be covered at a sufficiently high coating ratio.

In a case where a gap exists in the lubricant layer, an environmental substance which generates a contaminant such as ionic impurities adsorbed on the surface of the magnetic recording medium passes through the gap of the lubricant layer, and enters a lower layer of the lubricant layer. The environmental substance entering the lower layer of the lubricant layer coagulates a slight amount of ion components existing therein, and generates an ionic contaminant. Then, this contaminant (a coagulation component) is attached (transferred) to the magnetic head at the time of performing magnetic recording and reproducing, and thus, ti e magnetic head is broken, or magnetic recording and reproducing properties of the magnetic recording and reproducing apparatus decrease. A problem which occurs due to the entering of the environmental substance from such a gap of the lubricant layer becomes remarkable in a case where the magnetic recording medium is retained under high-temperature conditions.

In addition, in a case where a film having an average film thickness of less than or equal to 2 nm is formed by using only the compound B instead of the lubricant layer 4, a bonding force (wettability) between the compound B and the protective layer 3 becomes insufficient, and thus, an island-like film is formed, and the surface of the protective layer 3 cannot be covered at a sufficiently high coating ratio.

In addition, in a case where a film having an average film thickness of less than or equal to 2 nm is formed by using only the compound C instead of the lubricant layer 4, a bonding force (wettability) between the compound C and the protective layer 3 becomes insufficient, and thus, an island-like film is formed, and the surface of the protective layer 3 cannot be covered at a sufficiently high coating ratio.

(Mass Ratio(A/(A+B+C)))

A mass ratio (A/(A+B+C)) of the compound A with respect to the sum of the masses of the compounds A, B, and C is in a range of 0.05 to 0.6, and is preferably in a range of 0.1 to 05. By setting a mass ratio (A/(A+B+C)) to be in a range of 0.05 to 0.6, it is possible to ensure the number of bondings between the nitrogen atom contained in the outermost surface of the nitrogen-containing layer 3b and the hydroxyl group contained in the compound A to the compound C, and it is possible to sufficiently ensure the number of bondings between the carbon atom contained in the outermost surface of the nitrogen-containing layer 3b and the six-membered ring contained in the compound A. Accordingly, the protective layer 3 is bonded to the lubricant layer 4 with a high bonding force. In addition, by setting the mass ratio A/(A+B C)) to be less than or equal to 0.6, preferably to be less than or equal to 0.5, it is possible to fill a gap formed between the compound A with a sufficient amount of compound B and compound C, and it is possible to prevent the magnetic recording medium 11 from being contaminated due to entering of an environmental substance from a gap of the lubricant layer 4, and it is possible to thin the thickness of the lubricant layer 4. By setting the mass ratio (A/(AB+C)) to be greater than or equal to 0.05, preferably to be greater than of equal to 0.1, it is possible to prevent a decrease in a coating ratio of the protective layer 3 which occurs because excessive compounds B and compounds C become in the shape of an island on the outermost surface of the nitrogen-containing layer 3b.

In a case where the mass ratio (A/(A+B+C)) is less than 0.05, the compound A becomes insufficient, and the compound B and compound C become excessive, and thus, the lubricant layer 4 easily becomes in the shape of an island, and a coating ratio with respect to the protective layer 3 becomes insufficient. In addition, where the mass ratio (A/(A+B+C)) is greater than 0.6, the compounds B and C become insufficient, and thus, the lubricant layer 4 easily becomes in the shape of a mesh, and the coating ratio with respect to the protective layer 3 becomes insufficient.

(Mass Ratio(B/(A+B+C)))

A mass ratio (B/(A+B+C)) of the compound B to the sum of the masses of the compounds A, B, and C contained in the lubricant layer of this embodiment is in a range of 0.05 to 0.5, and is preferably in a range of 0.1 to 0.4. By setting a mass ratio (B/(A+B+O) to be less than or equal to 0.5, preferably to be less than or equal to 0.4, the compound B having four hydroxyl groups becomes excessive, and the hydroxyl group contained in the compound A to the compound C becomes excessive, and thus, a hydroxyl group which is not bonded to the nitrogen atom contained in the outermost surface of the nitrogen-containing layer 3$b$ is prevented from being generated. Therefore, a bonding force between the nitrogen atom contained in the outermost surface of the nitrogen-containing layer 3$b$ and the hydroxyl group contained in the compound A to the compound C and a bonding force between the carbon atom contained in the outermost surface of the nitrogen-containing layer 3$b$ and the six-membered ring contained in the compound A are sufficiently obtained. Accordingly, the protective layer 3 is bonded to the lubricant layer 4 with a high bonding force.

By setting the mass ratio (B/(A+B+C)) to be greater than or equal to 0.05, preferably to be greater than or equal to 0,1, the compound B having four hydroxyl groups is prevented from being insufficient, and the number of bondings between the nitrogen atom contained in the outermost surface of the nitrogen-containing layer 3$b$ and the hydroxyl group contained in the compound A to the compound C can be ensured. Accordingly, the protective layer 3 is bonded to the lubricant layer 4 with a high bonding force.

In a case where the mass ratio (B/(A+B+C)) is less than 0.05 or in a case where the mass ratio (B/(A+B+C)) is greater than 0.5, a mixing balance of the compounds A, B, and C deteriorates, the uncovered region on the surface of the protective layer 3 is not compensated by each compound, and the coating ratio of the protective layer 3 becomes insufficient.

(Mass Ratio(C/(A+B+C)))

A mass ratio (C/(A+B+C)) of the compound C to the sum of the masses of the compounds A, B, and C is in a range of 0.05 to 0.9, and is preferably in a range of 0.1 to 0.8. By setting a mass ratio (C/(A+B+C)) to he less than or equal to 0.9, preferably to be less than or equal to 0.8, the compound C having three hydroxyl groups becomes excessive, and the compound A relatively decreases, and thus, it is possible to prevent a bonding force between the carbon atom contained in the outermost surface of the nitrogen-containing layer 3$b$ and the six-me/ red ring contained in the compound A from being insufficient. In addition, by setting the mass ratio (C/(A+B+C)) to be greater than or equal to 0.05, preferably to be greater than or equal to 0.1, the compound B having four hydroxyl groups becomes excessive, and thus, a hydroxyl group which is not bonded to the nitrogen atom contained in the outermost surface of the nitrogen-containing layer 3$b$ is prevented from being generated, and the compound A becomes excessive, and thus, the lubricant layer 4 is prevented from being in the shape of a mesh.

In a case where the mass ratio (C/(A+B+C)) is less than 0.05 or in a case where the mass ratio (C/(A+B+C)) is greater than 0.9, a mixing balance of the compounds A, B, and C deteriorates, the uncovered region on the surface of the protective layer 3 is not compensated by each compound, and the coating ratio of the protective layer 3 becomes insufficient.

(Film Thickness of Lubricant Layer)

The average film thickness of the lubricant layer 4 is in a range of 0.5 nm (5 Å) to 2 nm (20 Å), and is preferably in a range of 1 nm to 1.9 nm.

By setting the average film thickness the lubricant layer 4 to be greater than or equal to 0.5 nm, properties obtained by containing the compound A, the compound B, and ti e compound C in the lubricant layer 4 are sufficiently exhibited. That is, the compound B and the compound C enter a gap formed between the compounds A, the gap between the compounds A is filled with the compound B and the compound C, and a bonding force between the nitrogen atom contained in the outermost surface of the nitrogen-containing layer 3$b$ and the hydroxyl group contained in the compound A to e compound C and a bonding force between the carbon atom contained in the outermost surface of the nitrogen-containing layer 3$b$ and the six-membered ring contained in the compound A are sufficiently obtained. Accordingly, the lubricant layer 4 having an average film thickness of greater than or equal to 0.5 nm is bonded to the protective layer 3 with a strong bonding force, is not in the shape of an island or a mesh, and can prevent the magnetic recording medium 11 from being contaminated due to entering of an environmental substance from a imp of the lubricant layer 4.

In addition, the average film thickness of the lubricant layer 4 is less than or equal to 2 nm, and thus, it is possible to sufficiently decrease the floating amount of the magnetic head, and it is possible to increase the recording density of the magnetic recording medium 11.

(Formation Method of Lubricant Layer)

A magnetic recording medium in the middle of the manufacturing is prepared in which each of the layers up to the protective layer 3 is formed on the nonmagnetic substrate 1, a solution for forming a lubricant layer is applied onto the protective layer 3 of the magnetic recording medium in the middle of the manufacturing, and thus, the lubricant layer 4, for example, can be formed on the protective layer 3.

The solution for forming a lubricant layer, for example, can be obtained by mixing the compounds A, B, and C such that the mass ratio is in the range described above, by diluting the mixture with a solvent, and by setting viscosity and concentration to be suitable for a coating method.

Examples of the solvent used in the solution for forming a lubricant layer include a fluorine-based solvent such as Vera XF (product name, manufactured by Du Pont-Mitsui Fluorochemicals Co., Ltd.), and the like.

A coating method of the solution for forming a lubricant layer is not particularly limited, and examples of the coating method include a spin coating method, a dipping method, and the like.

Examples of a dipping method include a method in which the nonmagnetic substrate 1 on which each of the layers up to the protective layer 3 is formed is dipped in the solution for forming a lubricant layer which is put into a dipping tank of a clip coating device, and after that, the nonmagnetic substrate 1 is pulled up from the dipping tank at a predetermined speed. By using the dipping method, it is possible to uniformly apply the solution for forming a lubricant layer onto the surface of the protective layer 3 of the nonmagnetic substrate 1, and it is possible to form the lubricant layer 4 on the protective layer 3 with a uniform film thickness.

(Magnetic Recording and Reproducing Apparatus)

Figure 2:
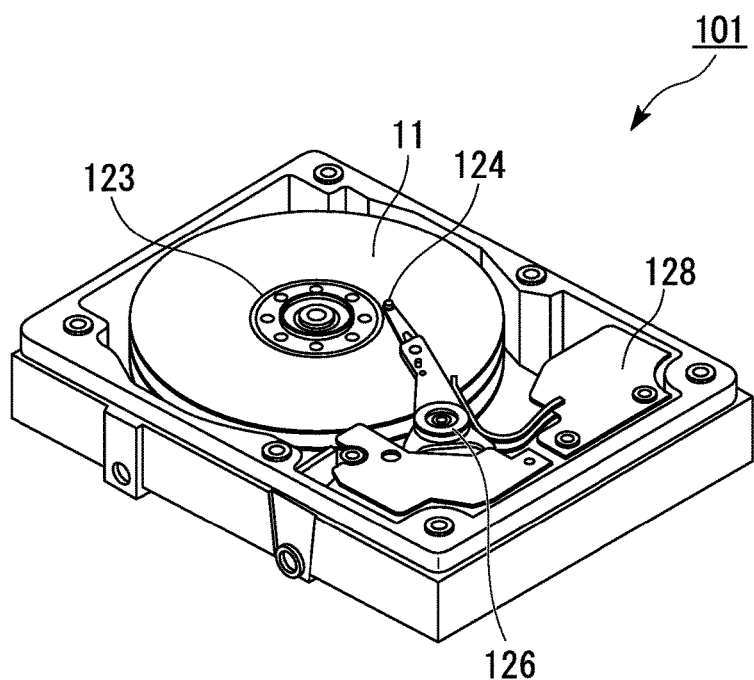
FIG. 2 is a perspective view illustrating an example of a magnetic recording and reproducing apparatus of the present invention.

Next, an example of the magnetic recording and reproducing apparatus of the embodiment of the present invention will be described. FIG. 2 is a perspective view illustrating example of a magnetic recording and reproducing apparatus of an embodiment of the present invention.

A magnetic recording and reproducing apparatus 101 of this embodiment includes the magnetic recording medium 11 illustrated in FIG. 1, a medium-driving unit 123, a magnetic head 124, a head-moving unit 126, and a recording and reproducing signal-processing unit 128.

The medium-driving unit 123 drives the magnetic recording medium 11 in a recording direction. The magnetic head 124 includes a recording unit and a reproducing unit, and has functions of recording information to the magnetic recording medium 11 and of reproducing information from the magnetic recording medium 11. Specifically, the recording unit records information to the magnetic recording medium 11, and the reproducing unit reproduces information from the magnetic recording medium 11. The head-moving unit 126 moves the magnetic head 124 relative to the magnetic recording medium 11. The recording and reproducing signal-processing unit 128 processes a recording signal transmitted to the magnetic head 124 and a reproducing signal received from the magnetic head 124.

An element unit (the reproducing unit) of the magnetic head 124 is configured of a GMR head or a TMR head, and thus, it is possible to obtain a sufficient signal strength even in a high recording density, and it is possible to realize a magnetic recording and reproducing apparatus having a high recording density.

The magnetic recording and reproducing apparatus 101 of this embodiment includes the magnetic recording medium 11 which is rarely contaminated, and thus, it is possible to prevent recording and reproducing properties from decreasing or floating stability from deteriorating by transferring a containment to the magnetic head 124. Therefore, ti e magnetic recording and reproducing apparatus 101 of this embodiment has stable magnetic recording and reproducing properties.

EXAMPLES

Hereinafter, the present invention will be described in detail on the basis of examples. Furthermore, the present invention is not limited to the examples, but can be performed in conditions suitably selected in a range not changing the gist of the present invention.

Example 1

A glass substrate manufactured by HOYA Corporation, and an outer dimension of 2.5 inches) which had been washed was contained in a film-forming chamber of a DC magnetron sputtering device (C-3040, manufactured by Canon Anelva Corporation), and the film-forming chamber was exhausted until the ultimate vacuum became $1\times10^{-5}$ Pa.

After that, an adhesive layer having a layer thickness of 10 nm was formed on the glass substrate by a sputtering method using a Cr target.

Subsequently, a soft magnetic underlayer was formed on the adhesive layer by a sputtering method. A first soft magnetic layer, an intermediate layer, and a second soft magnetic layer were formed in this order as the soft magnetic underlayer. First, the first soft magnetic layer having a layer thickness of 25 nm was formed by using a Co-20Fe-5Zr-5Ta target {a Fe content of 20 atomic %, a Zr content of 5 atomic %, a Ta content of 5 atomic %, oud residual Co} at a substrate temperature of lower than or equal to 100° C. Next, the intermediate layer formed of Ru of which the layer thickness was 0.7 nm was formed. After that, the second soft magnetic layer formed of Co-20Fe-5Zr-5Ta of which the layer thickness was 25 nm was formed.

Next, a seed layer having a layer thickness of 5 nm was formed on the soft magnetic underlayer by a sputtering method using a Ni-6W target {a W content of 6 atomic % and residual Ni}.

After that, a Ru layer having a layer thickness of 10 nm was formed on the seed layer as a first orientation control layer by a sputtering method at a sputtering pressure of 0.8 Pa. Next, a Ru layer having a layer thickness of 10 nm was formed on the first orientation control layer as a second orientation control layer by using a sputtering method at a sputtering pressure of 1.5 Pa.

Subsequently, a first magnetic layer formed of $91(Co15Cr16PO-6(SiO_2)-3(TiO_2)$ {a Cr content of 15 atomic %, a Pt content of 16 atomic %, an alloy of residual Co of 91 mol %, an oxide formed of $SiO_2$ of 6 mol %, and an oxide formed of $TiO_2$ of 3 mol %} of which the layer thickness was 9 nm was formed on the second orientation control layer by a sputtering method. Here, a sputtering pressure was 2 Pa.

Next, a non-magnetic layer formed of $88(Co30Cr)-12(TiO_2)$ {a Cr content of 30 atomic %, an alloy of residual Co of 88 mol %, and $TiO_2$ of 12 mol %} of which the layer thickness was 0.3 nm was formed on the first magnetic layer by a sputtering method.

After that, a second magnetic layer forrned of $92(Co11Cr18Pt)-5(SiO_2)-3(TiO_2)$ {a Cr content of 11 atomic %, a Pt content of 18 atomic %, an alloy of residual Co of 92 mol %, $SiO_2$ of 5 mol %, and $TiO_2$ of 3 mol %} of which the layer thickness was 6 nm was formed on the non-magnetic layer by a sputtering method. Here, a sputtering pressure was 2 Pa.

After that, a non-magnetic layer formed of Ru of which the layer ckness was 0.3 nm was formed on the second magnetic layer by a sputtering method.

Subsequently, a third magnetic layer having a layer thickness of 7 nm was formed on the non-magnetic layer by a sputtering method using a Co-20Cr-14Pt-3B target {a Cr content of 20 atomic %, a Pt content of 14 atomic %, a B content of 3 atomic %, and residual Co} at a sputtering pressure of 0.6 Pa.

[Formation of Protective Layer]

A hydrogenated carbon film was formed on the surface of the magnetic layer by an ion beam vapor deposition method using gasified toluene as a raw material gas. When the hydrogenated carbon film was formed, first, a gas flow rate of raw material gas which was supplied to a film formation chamber was set to 2.9 SCCM, and a reaction pressure was set to 0.2 Pa. Further, cathode power, which was an excitation source of the raw material gas, was set to 225 W (AC 22.5 V, 10 A). Then, the hydrogenated carbon film was formed such that a voltage between a cathode electrode and an anode electrode covering the cathode electrode was 75 V, a current was 1650 mA, an acceleration voltage of ions was 200 V, a current was 180 mA, a film formation time was 1.5 seconds, and a thickness was 3.5 nm. After the hydrogenated carbon film was formed, the supply of the raw material gas was stopped, and the film formation chamber was exhausted for 2 seconds.

Next, nitrogen gas was supplied into the film formation chamber at a gas flow rate of 2 SCCM and a reaction pressure of 5 Pa. Then, cathode power was set to 128 W(AC 16 V, 8 A), a voltage between the cathode electrode and the anode electrode was set to 75 V, a current was set to 1,000 mA, an acceleration voltage of the ions was set to 200 V, a current was set to 90 mA, a processing time was set to 1 second, and the surface of the hydrogenated carbon film was irradiated with nitrogen ions which were formed from the nitrogen gas and was exposed to nitrogen plasma. Accordingly, the surface of the hydrogenated carbon film was dehydrogenated and nitrided.

After the hydrogenated carbon film was subjected to surface processing (dehydrogenating processing and nitriding processing), the composition of the outermost surface thereof (the outermost surface of a protective layer) was measured by an X-ray photoelectron spectroscopy (Electron Spectroscopy for Chemical Analysis (ESCA)). The results are shown in Table 1.

[Formation of Lubricant Layer]

Next, a compound shown in Table 1 and described b-low was dissolved in Vertrel XF (Product Name, manufactured by Du Pont-Mitsui Huorochemicals Company, Ltd.) at amass ratio shown in Table 1, and thus, a solution for forming a lubricant layer was obtained. The concentration of the compound contained in the solution for forming a lubricant layer was 0.3 mass %.

Next, the solution for forming a lubricant layer was applied onto a protective layer of a nonmagnetic substrate by using a dipping method.

That is, the nonmagnetic substrate on which each layer up to the protective layer was formed was dipped in the solution for forming a lubricant lay r put into a dipping bath of a dip coating device, and after that, the nonmagnetic substrate was taken out from the dipping bath at a constant speed. Thus, the solution for forming a lubricant layer was applied onto the surface of the protective layer of the magnetic substrate such that the layer thickness of a lubricant layer became 1.3 nm.

After that, the surface coated e solution for forming a lubricant layer was dried, and thus, a lubricant layer was formed, and a magnetic recording medium of Example 1 was obtained.

Examples 2 to 9 and Comparative Examples 1 to 16

Magnetic recording mediums of Examples 2 to 9 and Comparative Examples 1 to 16 were obtained by the same method as that in Example 1 except that the composition of the outermost surface of the protective layer was changed and the type and the mass ratio of the compound used for forming the lubricant layer were changed as shown in Table 1 by adjusting a processing time of the surface processing (the dehydrogenating processing and the nitriding processing) of the hydrogenated carbon film. Furthermore, in Comparative Example 11 and Comparative Example 12, a mass ratio was calculated by regarding the mass of the other compounds as the mass of the compound A.

In addition, in a stage where the surface processing of the hydrogenated carbon film ended in the middle of manufacturing the magnetic recording mediums of Examples 2 to 9 and Comparative Examples 1 to 16, the composition of the outermost surface of the hydrogenated carbon film (the outermost surface of the protective layer) was measured by a secondary ion mass spectrometry (SIMS). The results are shown in Table 1.

TABLE 1

| | Compound A | Compound B | Compound C | Mass Ratio (A/(A + B + C)) | Mass Ratio (B/(A + B + C)) | Mass Ratio (C/(A + B + C)) | Boundary Surface Composition (C/H/N (Atomic %)) | Si Adsorption Amount (Relative Value) |
|---|---|---|---|---|---|---|---|---|
| Example 1 | ART-1 | D4OH(s) | D3OH(s) | 0.05 | 0.4 | 0.55 | 20/0/80 | 0.33 |
| Example 2 | ART-1 | D4OH(s) | D3OH(s) | 0.1 | 0.3 | 0.6 | 20/0/80 | 0.32 |
| Example 3 | ART-1 | D4OH(s) | D3OH(s) | 0.2 | 0.2 | 0.6 | 20/0/80 | 0.29 |
| Example 4 | ART-1 | D4OH(s) | D3OH(s) | 0.3 | 0.1 | 0.6 | 20/0/80 | 0.23 |
| Example 5 | ART-1 | D4OH(s) | D3OH(s) | 0.6 | 0.1 | 0.3 | 20/0/80 | 0.32 |
| Comparative Example 1 | ART-1 | D4OH(s) | D3OH(s) | 0.8 | 0.1 | 0.1 | 20/0/80 | 0.39 |
| Comparative Example 2 | ART-1 | D4OH(s) | D3OH(s) | 0.9 | 0.05 | 0.05 | 20/0/80 | 0.39 |
| Comparative Example 3 | A2OH | — | — | 1 | 0 | 0 | 20/0/80 | 1.00 |
| Comparative Example 4 | ADOH | — | — | 1 | 0 | 0 | 20/0/80 | 1.10 |
| Comparative Example 5 | ART-1 | — | — | 1 | 0 | 0 | 20/0/80 | 0.91 |
| Comparative Example 6 | — | D4OH(s) | — | 0 | 1 | 0 | 20/0/80 | 0.85 |
| Comparative Example 7 | — | — | D3OH(s) | 0 | 0 | 1 | 20/0/80 | 0.84 |
| Comparative Example 8 | ART-1 | D4OH(s) | — | 0.7 | 0.3 | 0 | 20/0/80 | 0.44 |
| Comparative Example 9 | ART-1 | — | D3OH(s) | 0.3 | 0 | 0.7 | 20/0/80 | 0.43 |
| Comparative Example 10 | — | D4OH(s) | D3OH(s) | 0 | 0.2 | 0.8 | 20/0/80 | 0.79 |
| Comparative Example 11 | A2OH | D4OH(s) | D3OH(s) | 0.3 | 0.1 | 0.6 | 20/0/80 | 0.49 |
| Comparative Example 12 | ADOH | D4OH(s) | D3OH(s) | 0.3 | 0.1 | 0.6 | 20/0/80 | 0.43 |
| Example 6 | ART-1 | D4OH(s) | D3OH(s) | 0.3 | 0.1 | 0.6 | 10/0/90 | 0.37 |
| Example 7 | ART-1 | D4OH(s) | D3OH(s) | 0.3 | 0.1 | 0.6 | 30/0/70 | 0.28 |

TABLE 1-continued

| | Compound A | Compound B | Compound C | Mass Ratio (A/ (A + B + C)) | Mass Ratio (B/ (A + B + C)) | Mass Ratio (C/ (A + B + C)) | Boundary Surface Composition (C/H/N (Atomic %)) | Si Adsorption Amount (Relative Value) |
|---|---|---|---|---|---|---|---|---|
| Example 8 | ART-1 | D4OH(s) | D3OH(s) | 0.3 | 0.1 | 0.6 | 40/0/60 | 0.36 |
| Example 9 | ART-1 | D4OH(s) | D3OH(s) | 0.3 | 0.1 | 0.6 | 50/0/50 | 0.38 |
| Comparative Example 13 | ART-1 | D4OH(s) | D3OH(s) | 0.3 | 0.1 | 0.6 | 60/0/40 | 0.45 |
| Comparative Example 14 | ART-1 | D4OH(s) | D3OH(s) | 0.3 | 0.1 | 0.6 | 5/0/95 | 0.43 |
| Comparative Example 15 | ART-1 | D4OH(s) | D3OH(s) | 0.3 | 0.1 | 0.6 | 80/0/20 | 0.51 |
| Comparative Example 16 | ART-1 | D4OH(s) | D3OH(s) | 0.3 | 0.1 | 0.6 | 80/20/0 | 0.66 |

In the examples and the comparative examples, the compounds used for forming the lubricant layer are as described below.

ART-1 (Product Nat manufactured by MORESCO Corporation) Average Molecular Weight of 1,700

D4OH(s) (Product Name: manufactured by MORESCO Corporation) Average Molecular Weight of 1,600

D3OH(s) (Product Name: manufactured by MORESCO Corporation) Average Molecular Weight of 1,700

A2OH; A2OH-2000 (Product Name: manufactured by MORESCO Corporation)

ADOH; ADOH-2000 (Product Name: manufactured by MORESCO Corporation)

A2OH-2000, x is 5, $R_1$ is $CF_3$, and $R_2$ is $—OCH_2CF_2O(CF_2CF_2O)_t(CF_2O)_uCF_2CH_2OH$ is 10.5, and u is 10.1), in the general formula (4) described below, ADOH-2000, x is 5, $R_1$ is $CF_3$, and $R_2$ is $—OCH_2CF_2O(CF_2CF_2O)_p(CF_2O)_qCF_2CH_2OCH_2CH(OH)CH_2OH$ (p is 10.7, and q is 10.4), in the general formula (4) described below.

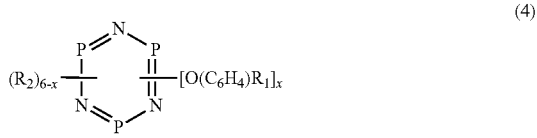

(4)

(Evaluation of Environment Resistance of Magnetic Recording Medium)

Environment resist, f the magnetic recording mediums of Examples 1 to 9 and Comparative Examples 1 to 16 was evaluated by using one of methods of examining a contaminated state of the magnetic recording medium due to an environmental substance generating a contaminant under a high-temperature environment. In the evaluation of the environment resistance described below, a Si ion was used as the environmental substance, and a Si adsorption amount: was measured as the mass of the contaminant generated by the environmental substance.

Specifically, first, the magnetic recording medium as an evaluation target was retained in a high-temperature environment of 85° C. and humidity of 0% for 240 hours in the presence of siloxane-based Si rubber. Next, the Si adsorption amount existing on the surface of the magnetic recording medium was analyzed and measured by using SIMS, and the degree of contamination due to the Si ion was evaluated.

Furthermore, the Si adsorption amount was evaluated by using a relative numerical value at the time of setting the result of Comparative Example 1 to 1.00. The results are shown in Table 1.

From Table 1, it was obvious that, in the magnetic recording mediums of Examples 1 to 9, the Si adsorption amount decreases, and the magnetic recording medium was rarely contaminated with the environmental substance under a high-temperature environment, compared to the magnetic recording mediums of Comparative Examples 1 to 16. It is assumed that, in the magnetic recording mediums of Examples 1 to 9, the lubricant lay r is not in the shape of an island or a mesh, and the lubricant layer is bonded to the protective layer with a strong bonding force, and thus, even in a case where the average film thickness of the lubricant layer is thinned, the protective layer is covered with the lubricant layer at a high coating ratio.

The magnetic recording medium and the magnetic recording and reproducing apparatus of the present invention can be used in the industry of using and manufacturing a magnetic recording medium and a magnetic recording and reproducing apparatus having high recording density.

While preferred embodiments of e invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: NONMAGNETIC SUBSTRATE
2: MAGNETIC LAYER
3: PROTECTIVE LAYER
4: LUBRICANT LAYER
11: MAGNETIC RECORDING MEDIUM
101: MAGNETIC RECORDING AND REPRODUCING APPARATUS
123: MEDIUM-DRIVING UNIT
124: MAGNETIC HEAD
126: HEAD-MOVING UNIT
128: RECORDING AND REPRODUCING SIGNAL-PROCESSING UNIT

What is claimed is:

1. A magnetic recording medium comprising at least a magnetic layer, a protective layer, and a lubricant layer on a nonmagnetic substrate in this order, wherein an outermost surface of the protective layer on the lubricant layer side contains carbon and nitrogen, the nitrogen is contained in the outermost surface in a range of 50 atomic % to 90 atomic %, the lubricant layer is formed by being in contact with the outermost surface, has an average film thickness of 0.5 nm to 2 nm, and contains a compound A represented in the below general formula (1), a compound B represented in the below general formula (2), and a compound C represented in the below general formula (3), and a mass ratio (A/(A+B+C)) of the compound A with respect to a s of masses of the compounds A, B, and C contain d in the lubricant layer is in a range of 0.05 to 0.6, a mass ratio (B/(A+B+C)) of the compound B with respect to the sum of the masses of the compounds A, B, and C contained in the lubricant layer is in a range of 0.05 to 0.5, and a mass ratio (C/(A+B+C)) of the compound C with respect to the sum of the masses of the compounds A, B, and C contained in the lubricant layer is in a range of 0.05 to 0.9,

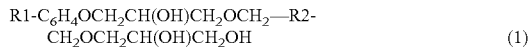  (1)

in the general formula (1), R1 is an alkoxy group having 1 to 4 carbon atoms, R2 is —CF$_2$O(CF$_2$CF$_2$O)x(CF$_2$O)yCF$_2$— (an order in parentheses of x and y may be this order, the opposite order, or a random order (each of x and y is an integer of 0 to 15).)

  (2)

in the general formula (2), m is an integer in a range of 4 to 50,

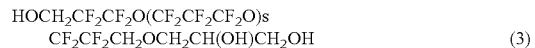  (3)

in the general formula (3), s is an integer.

2. The magnetic recording medium according to claim 1, wherein an average molecular weight of the compound A is in a range of 1,000 to 2,500.

3. The magnetic recording medium according to claim 1, wherein an average molecular weight of the compound B is in a range of 1,000 to 2,500.

4. The magnetic recording medium according to claims 1, wherein an average molecular weight of the compound C is in a range of 1,000 to 2,000.

5. A magnetic recording and reproducing apparatus, comprising:

the magnetic recording medium according to claims 1;

a medium-driving unit that drives the magnetic recording medium in a recording direction;

a magnetic head that records information to the magnetic recording medium and reproduces information from the magnetic recording medium;

a head-moving unit that moves the magnetic head relative to the magnetic recording medium; and a recording and reproducing signal-processing unit that processes a recording signal transmitted to the magnetic head and a reproducing signal received from the magnetic head.

* * * * *